US 8,495,043 B2

(12) United States Patent
Mantena et al.

(10) Patent No.: US 8,495,043 B2
(45) Date of Patent: Jul. 23, 2013

(54) SYSTEM AND METHOD FOR ALLOWING UPDATES TO DATABASE OBJECTS (75) Inventors: Gouri Mantena, Cary, NC (US); Tulasi J. Markham, Peekskill, NY (US); Hoa Pham, Cary, NC (US); Tuan A. Pham, Cary, NC (US); William J. Reilly, Cary, NC (US); Yi-Wen Tan, Raleigh, NC (US); Mai T. Tran, Gaithersburg, MD (US); Debra J. Waite, Clayton, NC (US)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 12/212,334

(22) Filed: Sep. 17, 2008

(65) Prior Publication Data

US 2010/0070481 A1 Mar. 18, 2010

(51) Int. Cl.
*G06F 7/00* (2006.01)
*G06F 17/00* (2006.01)

(52) U.S. Cl.
USPC ........................................ 707/704

(58) Field of Classification Search
None
See application file for complete search history.

(56) References Cited

U.S. PATENT DOCUMENTS

| 5,649,200 | A | * | 7/1997 | Leblang et al. ............... 717/122 |
| 7,286,394 | B2 | | 10/2007 | Ooishi |
| 7,292,668 | B2 | | 11/2007 | Yamawaki |
| 7,313,578 | B2 | | 12/2007 | Gagne et al. |
| 7,421,548 | B2 | | 9/2008 | Davis et al. |
| 7,606,881 | B2 | * | 10/2009 | Chasman et al. ............ 709/221 |
| 2004/0117377 | A1 | * | 6/2004 | Moser et al. .................... 707/10 |
| 2006/0259949 | A1 | * | 11/2006 | Schaefer et al. .................. 726/1 |
| 2007/0133510 | A1 | | 6/2007 | Da Palma et al. |
| 2007/0239798 | A1 | * | 10/2007 | Shringi et al. ................ 707/201 |
| 2008/0183711 | A1 | | 7/2008 | DeGraaff et al. |
| 2009/0125518 | A1 | * | 5/2009 | Bailor et al. ...................... 707/8 |
| 2009/0150396 | A1 | * | 6/2009 | Elisha et al. ...................... 707/8 |

* cited by examiner

*Primary Examiner* — Cheryl Lewis
*Assistant Examiner* — Raheem Hoffler
(74) *Attorney, Agent, or Firm* — John R. Pivnichny; Keohane & D'Alessandro, PLLC (57) ABSTRACT

A system and method for allowing flexible and simultaneous updates to database objects from one or more users is disclosed. The system may receive a change request to the object from the first user and then from a second user. The system may determine if the object is locked and, if so, informing the first user. If an edit request is received from the second user, the second user may be provided with multiple options, such as incorporating changes made by first user and overwriting changes made by second user with changes made by first user, incorporating changes made by first user and overwriting changes made by first user with changes made by second user, and cancelling changes made by second user.

19 Claims, 7 Drawing Sheets

User 1

Save sales order SO100 at 11:31:50:1111
- Change the object.
- Perform "UPDATE" request for object
- Check if object SO100 has been registered by user ID/terminal ID/session or batch ID
- If not, then error.
  - Get object lock info by user ID/terminal ID/session or batch ID.
  - If the last change date/time of object lock is <= User 1 registration date/time in the object and the registration object lock update is inactive:
    - Activate the registration object lock update
    - Allow the update.
    - Change the last change date of object lock to 20070722113150111
    - Change the user 1 to the object lock at 20070722113150111
    - Deactivate the registration object update
  - If the last change date/time of object lock is <= User 1 registration date/time in the object and the registration object lock update is active:
    - Wait until the update done and repeat the process.

Figure 6

User #2: Saved sales order SO100 at 11:32:50:1111
— Change the object.
— Send "UPDATE" request for object
— Check if object SO100 has been registered by user ID/terminal ID/session or batch ID If not, then error.
— Get object lock info by user ID/terminal ID/session or batch ID.
— If the last change date/time of object lock is greater than the User 2 registration date/time in the object, then multiple update options are provided to the User 2:

See Previous Updates: The user can refresh the changes made to see the previous updates that were done to the table key data, and the fact that user #1 made those changes. At this point, the user can make a decision to either:

Incorporate those previous changes into his changes (over-riding his changes with conflicts).
    Incorporate those previous changes into his changes, but having his changes over-write the conflicts.
    Cancel his changes completely.
    Over-ride previous updates without seeing them.
    Cancel his updates completely without seeing previous update.

– When an object is saved, it will perform a "UPDATE" request to process the object update:
– Check/get object lock info by user id/terminal id/session or batch id (if not found, then error)
– If last object lock change date/time <= user registration date/time & the object lock update is inactive
    Activate the registration object lock update
    Process update
    Perform update routines passed from caller
    Update object lock date/time to current one.
    Update the user registration date/time.
    Deactivate the registration object lock update
– If last object lock change date/time <= user registration date/time & the object lock update is active
    Wait until previous update done and repeat the update process
– Otherwise, provide update options:
  • see previous updates: refresh the changes made to see the previous updates that were done to the object. At this point, the user can make a decision to either:
    incorporate those previous changes into current changes (over-riding changes with conflicts).
    incorporate those previous changes into current changes, but having changes over-write the conflicts.
    cancel changes completely.
  • over-ride previous updates without seeing them.
  • cancel updates completely without seeing previous update.
– Return update status to the application

SYSTEM AND METHOD FOR ALLOWING UPDATES TO DATABASE OBJECTS

FIELD OF THE INVENTION

Aspects of the present invention provide a system and method for allowing updates to database objects by more than one user and, more particularly, allowing database objects to be updated by multiple users.

BACKGROUND OF THE INVENTION

Sometimes, a delayed response to a customer's need or request, such as in an order fulfillment market, especially when dealing in millions of dollars, can cause a loss of the order. Order fulfillment, for example, may be the complete process from point of sales inquiry to delivery of a product to the customer. Sometimes order fulfillment is used to describe a narrower act of distribution or the logistics function. However, in the broader sense it refers to the way how firms respond to customer orders. For instance, thousand of orders have to be placed into the order fulfillment channel on a daily basis and many touch points which need to be performed by customer sales representatives. Processing and management of an order has been divided into multiple stages and also handled by multiple customer service representatives. They may include backlog customer service representatives, workflow customer service representatives, order change customer service representatives, and billing customer service representatives, who in turn most often will need to perform update changes to the same order concurrently when a request is received from the customer. With the existing functionality in databases today, the user cannot perform simultaneous write or update access to the same key data with the same table by different users. If a first user in the order has update access, then the entire order will be completely locked by the first user until he/she exits out of update access mode of the order. The update limitation functionality existing in the current environment today will cause a major customer satisfaction issue, as well as the company may be facing lost sale to other competitors.

The current object update options for tables and sales documents were deemed not acceptable for critical updates due to the requirement for multiple concurrent updates for the various users to enhance productivity. Also, over-writing of previous users' data without warning allowed for problems with updates not occurring when the users thought they were completed.

SUMMARY OF THE INVENTION

In general, aspects of the present invention provide a system and a method for making changes to a data object, the system and method comprising receiving one or more changes to the data object from a first user, receiving a request from a second user for access to the data object, determining if the data object is locked, informing the first user of the request from the second user for access to the data object, receiving a request to save a change to the data object from the second user, providing the second user with one or more of the options of incorporating the one or more changes made by the first user and overwriting changes made by the second user with changes made by the first user for those changes made by the second user that conflict with the changes made by the first user, incorporating changes made by the first user and overwriting changes made by the first user with changes made by the second user if the changes made by the second user conflict with the changes made by the first user, and canceling changes made by the second user.

A second embodiment comprises a computer program product embodied in a computer readable medium for operating in a system comprising at least one computer system having a network, a processing unit, and a memory, for implementing a method for allowing flexible changes by more than one user to objects in a database, the database having a maintenance application, the method comprising receiving one or more changes to the object from a first user, receiving a request from a second user for access to the object, determining if the object is locked, informing the first user of the received request, receiving a request to save changes to the object from the second user, providing the second user with one or more of the options of incorporating changes made by the first user and overwriting changes made by the second user with changes made by the first user when the changes conflict, incorporating changes made by the first user and overwriting changes made by the first user with changes made by the second user when the changes conflict, and canceling changes made by the second user.

A third embodiment may consist of a method for deploying a computing infrastructure comprising integrating computer-readable code into a computing system, wherein the code in combination with the computing system for making changes to a data object for performing a process of allowing flexible and simultaneous updates, the process comprising receiving one or more changes to the data object from a first user, receiving a request from a second user for access to the data object, determining if the data object is locked, informing the first user of the received request, receiving a request to save changes to the data object from the second user, providing the second user with one or more of the options of incorporating changes made by the first user and overwriting changes made by the second user with changes made by the first user where the changes conflict, incorporating changes made by the first user and overwriting changes made by the first user with changes made by the second user where the changes conflict, and cancelling changes made by the second user.

Another embodiment comprises a system allowing flexible and simultaneous updates to objects in a database having one or more objects containing data having date and time information therein, the system comprising a database management system for receiving requests from a first user and a second user for edit access to the objects and for determining which data is to be stored in the objects depending upon date and time information stored therein, the database management system having a registry for storing information about allowed edit accesses, an object mechanism for managing objects, a registry checker for examining the registry to determine whether an object requested by the second user to be edited is being edited by the first user and, if so, for determining the date and time of the first user edits and a warning mechanism for providing a warning to the second user if the first user is editing the data object requested by the second user.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

Aspects of the present invention provide a solution for allowing flexible and simultaneous updates to a database object by more than one user.

In an object database (also object oriented database), information is represented in the form of objects as used in object-oriented programming. When database capabilities are combined with object programming language capabilities, the result is an object database management system (ODBMS) or database management system (DBMS). An ODBMS makes database objects appear as programming language objects in one or more object programming languages. An ODBMS extends the programming language with transparently persistent data, concurrency control, data recovery, associative queries, and other capabilities.

An object may represent most any subjects. One example is a sales order. The object may be, in one embodiment, an allocated region of storage. Since programming languages use variables to access objects, the terms "object" and "variable" are often used interchangeably. However, until memory is allocated, an object does not exist. Three properties may characterize objects: the identity of the object that distinguishes it from other objects; the behavior that describes the methods in the object's interface by which the object can be used; and the state that describes the data stored in the object. The state of the object may also contain data such as access time/date, update time/date, and store time/date by users of the database system.

When an object is modified/edited in a maintenance application, for example, that may be included in the DBMS, the system may lock the object (such as a sales order) until the user exits the maintenance application. A lock may be a synchronization mechanism for enforcing limits on access to the data object in a database where there may be many threads of execution. Locks are one way of enforcing control policies. If an object is in object lock mode, other users are not allowed to edit the same object (i.e., a sales order) until the object is no longer locked and available for other updates.

Other users, who are trying to modify or change the object, may need to keep trying the maintenance application (such as a sales order change) until it is available, that is, until it is released by the user updating the object. When an object is modified or edited, the system may perform an "INQUIRY" request to register the object lock instead of locking the object itself.

Figure 1:
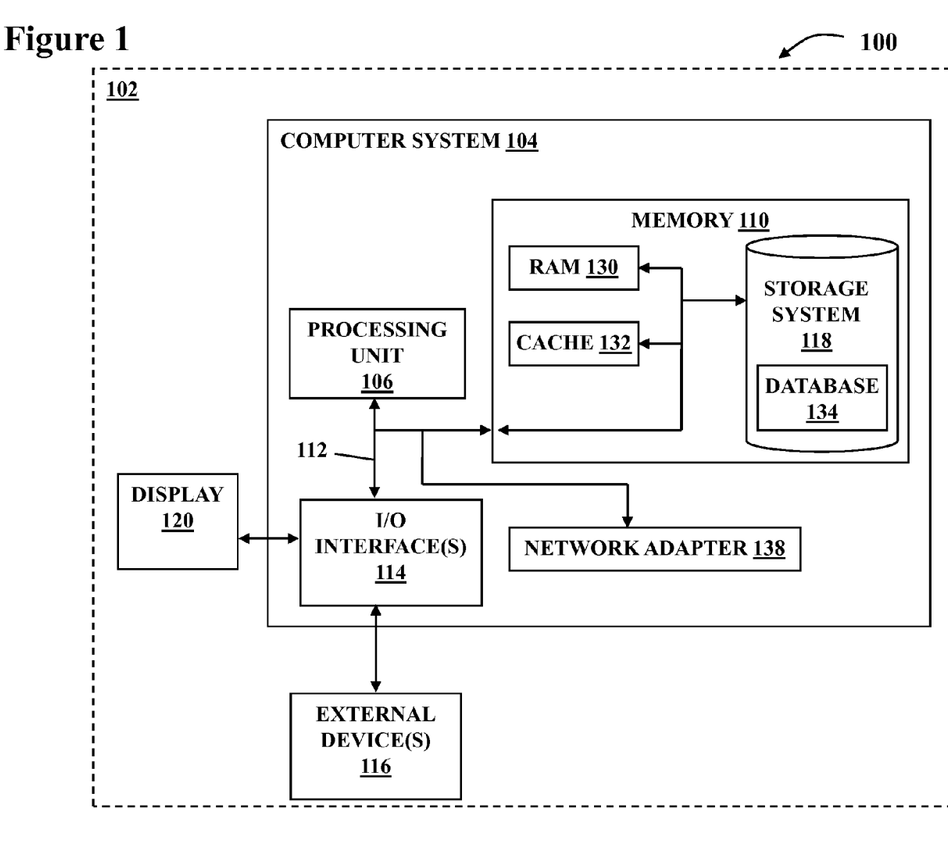
FIG. 1 shows a data processing system suitable for implementing an embodiment of the present invention.

A system, such as System 100, may have a data processing system, such as Data Processing System 102 shown in FIG. 1, suitable for storing and/or executing program code of the present invention, having a computer system, such as Computer System 104, having at least one processing unit (Processing Unit 106) coupled directly or indirectly to memory elements (Memory 110) through a system bus, such as System Bus 112. Memory 110 may include local memory (RAM 130) employed during actual execution of the program code, bulk storage (Storage System 118), and cache memories (Cache 132) that provide temporary storage of at least some program code in order to reduce the number of times code must be retrieved from Storage System 118 during execution. Storage System 118 may have a database, such as Database 134. A database may be a structured collection of records or data. A computer database relies upon software to organize the storage of data such as a database management system (DBMS). Input/output or I/O devices (such as Display 120, and other external devices (External Devices 116), including but not limited to keyboards, pointing devices, etc.) may be coupled to Computer System 104 either directly or through intervening I/O controllers (I/O Interface(s) 114). Network adapter(s) (Network Adapter 138) may provide access to external networks.

Figure 2:
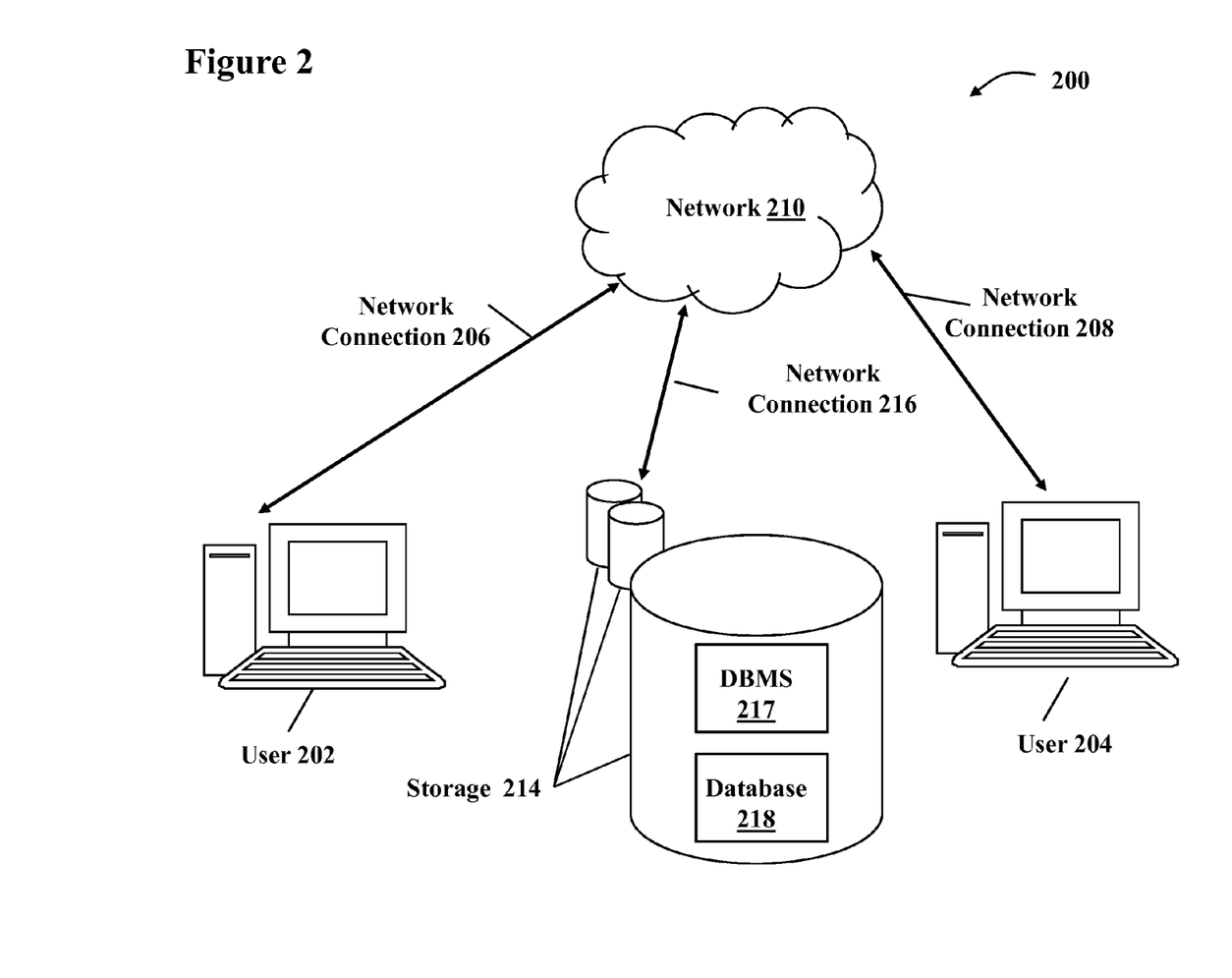
FIG. 2 shows a network for implementing an embodiment of the present invention.

FIG. 2 illustrates a networked system, such as System 200 to enable a data processing system (First User 202) to be coupled through network connection(s) (Network Connection 206, 208, 216) to other data processing users (User 2 204), and/or storage devices (Storage 214) through intervening private and/or public network(s) (Network 210). First User 202 and Second User 204 may have access to a database, such as Database 218. A database may be a structured collection of records or data and relies upon software to organize the storage of data. The software models the database structure in what are known as database models. The model in most common use today is the relational model. Other models such as the hierarchical model and the network model use a more explicit representation of relationships.

First User 202 and Second User 204 may be able, in basic database systems, to manage data in Database 218 through a database management system. Database management systems (DBMS), such as DBMS 217, are the software used to organize and maintain the database. These may be categorized according to the database model that they support. The model tends to determine the query languages that are available to access the database.

Figure 3:
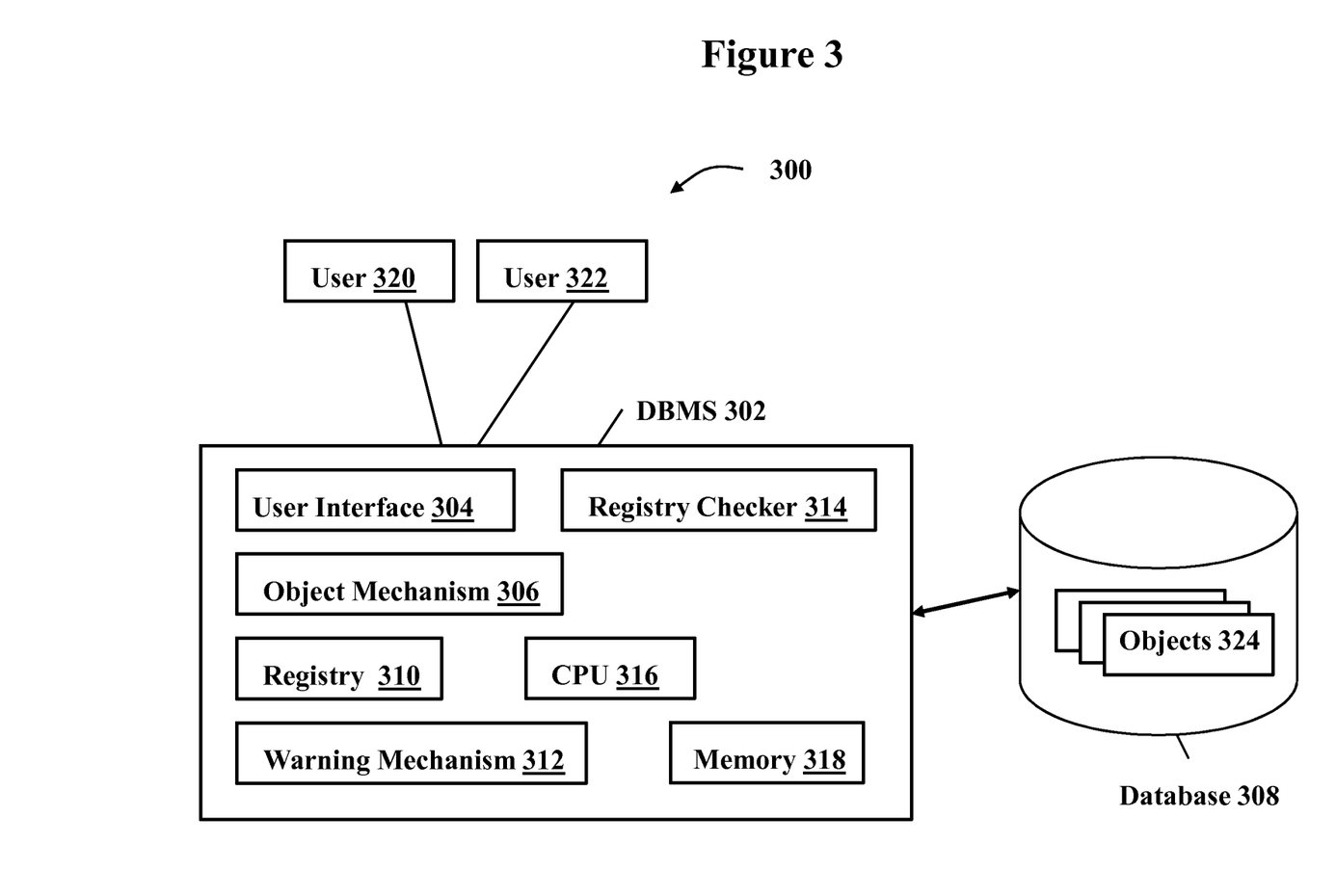
FIG. 3 illustrates an embodiment of the system of the present invention.

A system, such as System 300, may have database management system, such as DBMS 302, having a processor, such as CPU 316, and a memory, such as Memory 318. The processor may be of a class of logic machines that can execute computer programs and the memory allows the storage of data. An interface, such as User Interface 304, allows users, such as First User 320 and Second User 322, to input data to manipulate a system and to receive output, allowing the system to produce the effects of the user's manipulation.

DBMS 302 may communicate with a database, such as Database 308 that may have data objects, such as Objects 324. DBMS 302 may have a mechanism for managing objects, such as Object Mechanism 306 and a registry, such as Registry 310, for storing information about objects. A warning mechanism, such as Warning Mechanism 312, may provide a warning if an object is being edited by another user, for example. A system for checking the registry, such as Registry Checker 314, may be able to examine Registry 310 to determine if one user is editing an object requested by second user.

A system, such as DBMS 302, may allow a first user, such as First User 320, to lock a data object while Second User 322 modifies, amends, or updates the object so that a second user, such as Second User 322, would not have the ability to concurrently amend the data object. If two users are modifying the same data object, conflicts can occur within the data object, one user's modifications may overwrite the other user's relevant changes even if they are modifying different portions of the data object for instance and other undesirable issues may incur. Some systems and method don't allow more than one user to access for editing an object due to, in part, these concerns and issues.

Using an embodiment of the system and method of the present invention, more than one user may have access for modifying a data object at the same time. A first editing user may request to lock the object for editing and the system may create an object lock on the data object, which may be identified by a number, such as SO100. The object lock would then be registered at the then current time/date (e.g., 200707221130501111) with the user ID/terminal ID/session or batch ID). A second editing user may perform an "INQUIRY" request for locking object, e.g., SO100. The second user may receive the object lock information (for object SO100) from the previous user 1 registration). The second user's request is registered to the object lock at the then current date and time, e.g., 200707221130561111. The second user may receive a warning message, such as "User 1 is editing object SO100" is editing (because object SO100 has been locked). The first user may receive a message such as "User 2 is editing the same object".

The system may then save the sales order when user 1 has completed, such as at 11:31:50:1111—one minute after it was opened. The object may then be changed. The system may then perform an "UPDATE" request for object for updating the object in the database. The system may need to check if the object (e.g., SO100) has been previously registered by User 1 by, e.g., user ID/terminal ID/session or batch ID. If not, the system may issue an error. The system may obtain the object locking information by user ID/terminal ID/session or batch ID. If the last change date/time of object lock is <=User 1 registration date/time in the object and the registration object update is inactive. The system may activate the registration object lock update and allow the update. The system may then change the last change date of object lock to the most current date/time (e.g., 200707221131501111) and change User 1 to the object lock at 200707221131501111. The system may then deactivate the registration object update and, if the last change date/time of object lock is <=User 1 registration date/time in the object and the registration object update is active, the system may wait until the update done and repeat the process.

Figure 4:
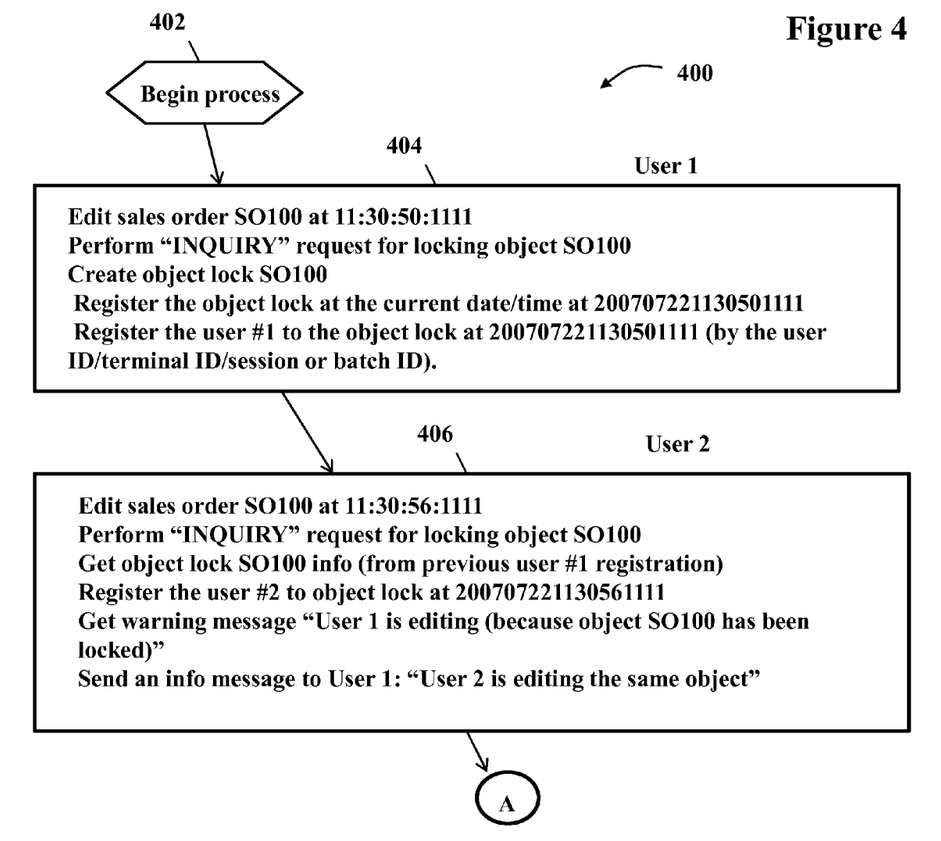
FIG. 4 illustrates an embodiment of a method of the present invention.

As shown in FIG. 4, a process, such as Process 400, that may run in DBMS 302, for managing the database may begin at 402. At 404, User 1, for example, may edit sales order "SO100" at 11:30:50:1111. The sales order number is "SO100" and the edit time is "11:30:50:1111" (11 hours, 30 minutes, 50 seconds and 1111 microseconds). The system may perform an "INQUIRY" request to Lock Object "SO100". The system then creates a Lock Object "SO100" and registers the object lock in Registry 310 at the current date/time at 200707221130501111. The system then registers User 1 to the object lock at 200707221130501111 (by the user identification (ID)/session or batch ID).

At 406, User 2 may edit sales order SO100 at 11:30:56:1111 that is six seconds later than the edit time. User 2 may perform "INQUIRY" request for object lock with a "Get lock object SO100" request including information (from previous User 1 registration). The system then may register User 2 to object lock at 200707221130561111 and issue a warning message such as "User 1 is editing (because object SO100 has been locked)." The system then sends a message to the User 1, "User 2 is editing the same object" and the process moves to "A".

Figure 5:
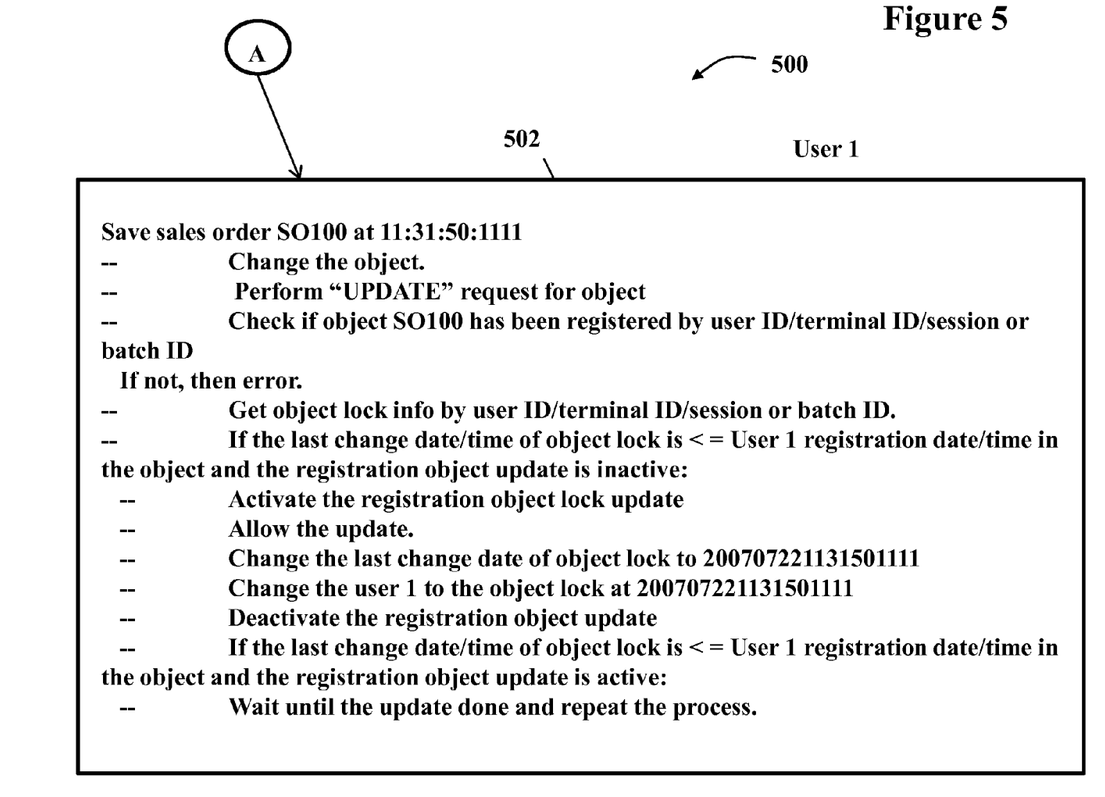
FIG. 5 illustrates a continuation of an embodiment of a method of the present invention.

As shown in FIG. 5, at "A", User 1 saves sales order SO100 at 11:31:50:1111 and changes the object. User 1 performs "UPDATE" request to the DBMS for the object and checks if object SO100 has been registered by user ID/terminal ID/session or batch ID. If the object SO100 has not been registered by user ID/terminal ID/session or batch ID not, then it registers an error. User 1 then gets the object lock information by user ID/terminal ID/session or batch ID. If the last change date/time of object lock is <=User 1 registration date/time in the object and the registration object update is inactive, then     the registration object lock update is activated;
    the update is allowed;
    the last change date of object lock is changed to 200707221131501111;
    the User 1 is changed to the object lock at 200707221131501111;
    the registration object update is deactivated; and
    if the last change date/time of object lock is <=User 1 registration date/time in the object and the registration object update is active, wait until the update done and repeat the process.

As shown in FIG. 5, process 500 continues at A and 502. The DBMS may save sales order SO100 at 11:31:50:1111, change the object, perform "UPDATE" request for object and check if object SO100 has been registered by user ID/terminal ID/session or batch ID. If not, then the system may issue and error.

The system may obtain the object lock information by user ID/terminal ID/session or batch ID. The system then determines if the last change date/time of object lock is <=User 1 registration date/time in the object and the registration object update is inactive and, if so, the system may activate the registration object lock update and allow the update. The system may change the last change date of object lock to 200707221131501111 and change user 1 to the object lock at 200707221131501111. The system may deactivate the registration object update. If the last change date/time of object lock is <=User 1 registration date/time in the object and the registration object update is active, then the system will wait until the update done and repeat the process.

Figure 6:
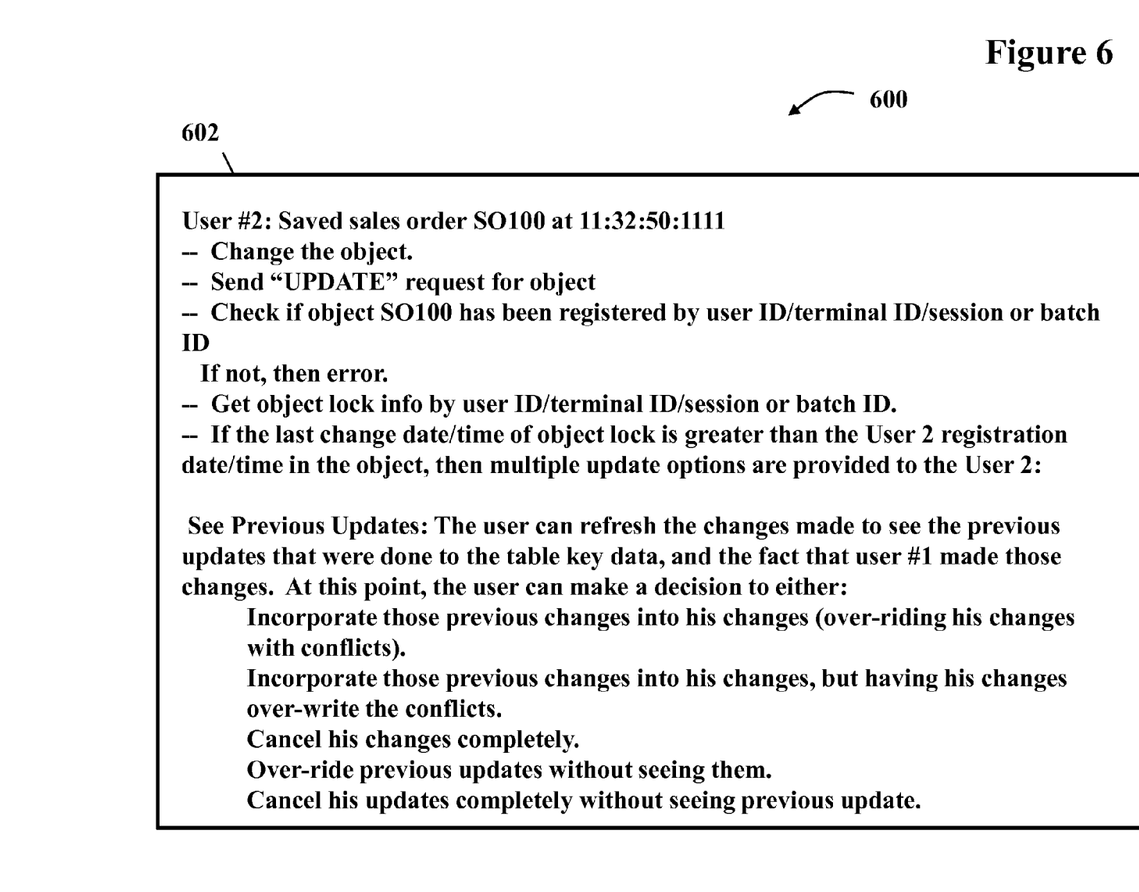
FIG. 6 illustrates an embodiment of the method of the present invention.

In FIG. 6, another embodiment of a process 600 of the present invention continues at 602, where User 2 may save the sales order SO100 at 11:32:50:1111 and change the object and send "UPDATE" request for the object, is shown. It is determined if object SO100 has been registered by user ID/terminal ID/session or batch ID and, if not, the system issues an error message. If so, User 2 may obtain object lock info by user ID/terminal ID/session or batch ID. It is determined if the last change date/time of object lock is greater than the User 2 registration date/time in the object, and, if so, then multiple update options are provided to the User 2. User 2 can then refresh the changes made to see the previous updates that were done to the table key data, and see that User 1 made those changes. At this point, User 2 can make a decision to: incorporate those previous changes into his changes (over-riding his changes with conflicts); incorporate those previous changes into his changes, but having his changes over-write the conflicts; cancel his changes completely; over-ride previous updates without seeing them; or cancel his updates completely without seeing previous update.

Figure 7:
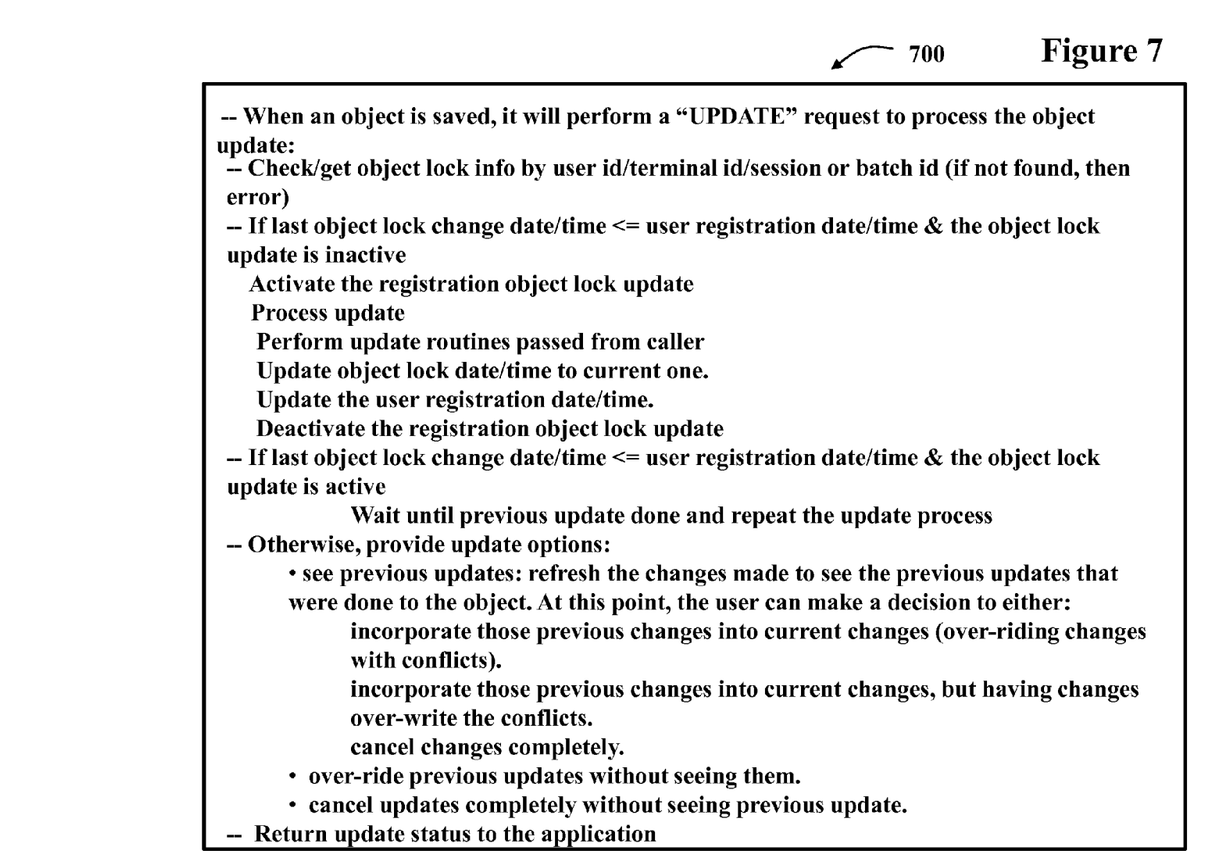
FIG. 7 is an illustrative embodiment of a method of the present invention.

As shown in FIG. 7, in method 700, when an object is saved, the system will perform an "UPDATE" request to process the object update and check the object lock information by user ID/terminal ID/session or batch ID, and, if not found, then error. If the last object lock change date/time <=user registration date/time and the object lock, then the update is not active. If not, the system may activate the registration object lock update and process update. Further it may perform update routines passed from caller and update object lock date/time to current one. It may then update the user registration date/time and deactivate the registration object lock update. The system may then determine if the last object lock change date/time <=user registration date/time and if the object lock update is active. If so, the system will wait until previous update done and repeat the update process but, if not, provide update options such as refresh the changes made to see the previous updates that were done to the object. At this point, the user can make a decision to either incorporate those previous changes into current changes (over-riding changes with conflicts), incorporate those previous changes into current changes, but having changes over-write the conflicts, cancel changes completely, over-ride previous updates without seeing them, or cancel updates completely without seeing previous update. An updated status is returned to the application.

It should be understood that the present invention is typically computer-implemented via hardware and/or software. As such, client systems and/or servers will include computerized components as known in the art. Such components typically include, (among others), a processing unit, a memory, a bus, input/output (I/O) interfaces, external devices, etc.

While shown and described herein as a system and method for allowing flexible and simultaneous updates to a database object by more than one user, it is understood that the invention further provides various alternative embodiments. For example, in one embodiment, the invention provides a computer-readable/useable medium that includes computer program code to provide a solution for allowing flexible and simultaneous updates in a database. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a computer-implemented method for allowing flexible and simultaneous updates to a database object by more than one user. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

In another embodiment, the invention provides a business method that performs the process steps of the invention on a subscription, advertising, and/or fee basis. That is, a service provider, such as a solution integrator, could offer to provide a solution for allowing flexible and simultaneous updates in a database. In this case, the service provider can create, maintain, and support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for making changes to a data object, the method comprising:
   receiving one or more changes to the data object from a first user;
   receiving a request from a second user for access to the data object;
   determining if the data object is locked;
   informing the first user of the request from the second user for access to the data object;
   receiving a request to save a change to the data object from the second user, wherein the request to save the change to the data object from the second user is subsequent to the one or more changes to the data object from the first user;
   providing the second user with priority over the first user to resolve a conflict between the one or more changes to the data object from the first user and the change to the data object from the second user by providing the second user with final authority to implement each of the following:
      incorporating the one or more changes made by the first user and overwriting changes made by the second user with changes made by the first user for those changes made by the second user that conflict with the changes made by the first user;
      incorporating changes made by the first user and overwriting changes made by the first user with changes made by the second user if the changes made by the second user conflict with the changes made by the first user; and
      canceling changes made by the second user.

2. The method as defined in claim 1 further comprising receiving a request to change the data object according to the changes made by the second user.

3. The method as defined in claim 2 further comprising receiving a data object inquiry request from the first user, creating a data object lock, and registering the data object at the then current date/time in the name of the first user.

4. The method as defined in claim 3 further comprising receiving from the second user an inquiry request, providing the second user with the data object lock information, providing a warning message to the second user that the first user is editing the data object and sending a warning message to the first user that the second user is editing the data object.

5. The method as defined in claim 4 further comprising receiving a change to the data object from the first user, changing the data object, checking if the data object is registered, checking if a last change date/time of object lock is less than or equal to the first user registration date/time in the object and if the registration object update is inactive.

6. The method as defined in claim 5 further comprising activating the registration object lock update, allowing the update, changing the last change date/time of object lock to the current time, and changing the first user's data object lock time to the current time.

7. The method as defined in claim 6 further comprising deactivating the registration object update if the last change date/time of data object lock is less than or equal to the first user registration date/time in the object and the registration object update is active, or waiting until the update is done.

8. The method as defined in claim 7 further comprising:
receiving a change from the second user to the data object;
receiving an update request for the data object;
checking if the data object has been registered by a user ID/terminal, ID/session or batch ID;
if the data object has not been registered by a user ID/terminal, ID/session or batch ID, then issuing an error message;
if the data object has been registered by a user ID/terminal, ID/session or batch ID, getting data object lock information by user ID/terminal, ID/session or batch ID; and
if the last change date/time of object lock is greater than the second user registration date/time in the object, then providing multiple update options to the second user.

9. The method as defined in claim 2 further comprising comparing the changes made by the second user to stored values of the data object and, if there no concurrent changes to the data in the data object, saving the changes made by the second user.

10. A computer program product embodied in a computer readable storage device for operating in a system comprising at least one computer system having a network, a processing unit, and a memory, for implementing a method for allowing flexible changes by more than one user to objects in a database, the database having a maintenance application, the method comprising:
receiving one or more changes to the object from a first user;
receiving a request from a second user for access to the object;
determining if the object is locked;
informing the first user of the received request;
receiving a request to save a change to the data object from the second user, wherein the request to save the change to the data object from the second user is subsequent to the one or more changes to the data object from the first user;
providing the second user with authority priority over the first user to resolve a conflict between the one or more changes to the data object from the first user and the change to the data object from the second user by providing the second user with final authority to implement each of the following:
incorporating changes made by the first user and overwriting changes made by the second user with changes made by the first user when the changes conflict;
incorporating changes made by the first user and overwriting changes made by the first user with changes made by the second user when the changes conflict; and
canceling changes made by the second user.

11. The computer program product as defined in claim 10 wherein the method further comprises receiving a request to change the object according to the changes made by the second user.

12. The computer program product as defined in claim 11 wherein the method further comprises receiving an object inquiry request from the first user, creating an object lock, registering the object at the then current date/time in the name of the first user.

13. The computer program product as defined in claim 12 wherein the method further comprises receiving from the second user an inquiry request, providing the second user with the object lock information, providing a warning message that the first user is editing the object and sending a warning message to the first user that the second user is editing the same object.

14. A method for deploying a computing infrastructure comprising integrating computer-readable code into a computing system, wherein the code in combination with the computing system for making changes to a data object for performing a process of allowing flexible and simultaneous updates, the process comprising:
receiving one or more changes to the data object from a first user;
receiving a request from a second user for access to the data object;
determining if the data object is locked;
informing the first user of the received request;
receiving a request to save a change to the data object from the second user, wherein the request to save the change to the data object from the second user is subsequent to the one or more changes to the data object from the first user;
providing the second user with priority over the first user to resolve a conflict between the one or more changes to the data object from the first user and the change to the data object from the second user by providing the second user with final authority to implement each of the following:
incorporating changes made by the first user and overwriting changes made by the second user with changes made by the first user where the changes conflict;
incorporating changes made by the first user and overwriting changes made by the first user with changes made by the second user where the changes conflict; and
cancelling changes made by the second user.

15. The method as defined in claim 14 wherein the process further comprises receiving a request to change the data object according to the changes made by the second user.

16. The method as defined in claim 15 wherein the process further comprises receiving a data object inquiry request from the first user, creating a data object lock, registering the data object at the then current time in the name of the first user.

17. The method as defined in claim 16 wherein the process further comprises receiving from the second user an inquiry request, providing the second user with the data object lock information, providing a warning message that the first user is editing the data object and sending a warning message to the first user that the second user is editing the same data object.

18. A system allowing flexible and simultaneous updates to objects in a database having one or more objects containing data having date and time information therein, the system comprising:
- a database management system operably associated with the at least one processing unit and one memory unit, the database management system configured for receiving requests from a first user and a second user for edit access to the objects and for determining which data is to be stored in the objects depending upon date and time information stored therein, the database management system having:
  - a registry for storing information about allowed edit accesses;
  - an object mechanism for managing objects;
  - a registry checker for examining the registry to determine whether an object requested by the second user to be edited is being edited by the first user and, if so, for determining the date and time of the first user edits; and
  - a warning mechanism for providing a warning to the second user if the first user is editing the data object requested by the second user, wherein the warning mechanism is configured to provide the second user with authority priority over the first user to resolve a conflict between the one or more changes to the data object from the first user and the change to the data object from the second user, wherein the change to the data object from the second user is subsequent to the one or more changes to the data object from the first user, by providing the second user with final authority to implement each of the following:
    - incorporating changes made by the first user and overwriting changes made by the second user with changes made by the first user where the changes conflict;
    - incorporating changes made by the first user and overwriting changes made by the first user with changes made by the second user where the changes conflict; and
    - cancelling changes made by the second user.

19. The system as defined in claim 18 wherein the warning mechanism comprises a mechanism for providing the second user with options of, if a last change date/time of object lock is less than or equal to a first user registration date/time in the object and the registration object update is active, then waiting until the update done and repeating the process.

* * * * *